June 7, 1966  H. J. RAND ETAL  3,254,645
RECIPROCATING HEART RESUSCITATION DEVICE
MEANS FOR ADJUSTING PRESSURE
Filed April 20, 1962  8 Sheets-Sheet 6

FIG. 11

INVENTORS.
HENRY J. RAND &
BY JOHN J. NAWALANIC

Meyer, Baldwin, Doran & Egan
ATTORNEYS

Fig.15

Fig.15a

# United States Patent Office 3,254,645
Patented June 7, 1966

3,254,645
RECIPROCATING HEART RESUSCITATION DEVICE MEANS FOR ADJUSTING PRESSURE
Henry J. Rand and John J. Nawalanic, Cleveland, Ohio, assignors to Rand Development Corporation, Cleveland, Ohio, a corporation of Ohio
Filed Apr. 20, 1962, Ser. No. 189,087
11 Claims. (Cl. 128—52)

This invention relates to a method of and apparatus for providing heart resuscitation to a person so stricken and is intended to deliver and direct to the body those functions which are necessary to the body for the facilitation of said heart resuscitation.

An object of this invention is to provide an apparatus for heart resuscitation which consists of a massaging unit, an oxygen unit, a defibrillating unit and controls therefor.

A further object of this invention is to provide an apparatus for heart resuscitation which is adjustable to the patient no matter what the size or age of said patient.

Still another object of this invention is to provide a portable apparatus which can be used on a hospital bed, cart, on the floor, or in many places where a large stationary unit cannot be taken.

Another object of the present invention is to provide a heart resuscitation apparatus which has all of the necessary calibration for the human functions of breathing, of lung movement and of chest cage movement.

Another object of this invention is to provide a chest massage unit which cushions the initial pressure to the patient's chest and rib cage when the massager unit is applied to the patient.

Another object of this invention is to provide a defibrillating unit and electrical connections which are arranged to be safe to the patient and the practicing physician.

Still another object of this invention is to provide a pressure limiting oxygen pump to safeguard the patient when air is pumped to the lungs of said patient.

Another object of this invention is to provide an apparatus which consists of a heart massaging unit, an air or oxygen unit, a defibrillating unit and the control therefor and providing the connections therebetween which would enable the operator of said apparatus to use any combination of units required to maintain life in a patient.

Another object of this invention is to provide a metering device for the air pump which enables the operator to regulate the air-oxygen intake to the needs of the patient.

Other objects will become readily apparent from the following specification and appended claims.

In the accompanying drawings, forming a part of this application, and in which like numerals are employed to designate like parts throughout the same.

FIG. 15 is a diagrammatic view illustrating apparatus for stopping the chest massaging plunger to relieve chest pressure to allow air or oxygen to enter the lungs for a longer time;

FIG. 15A is a fragmental sectional view taken along the line 15A—15A of FIG. 15; while FIG. 16 is a diagrammatic view illustrating a device which always stops the plunger in its uppermost position.

The object of the present device, whatever form it may take, is to provide mechanical means for causing a heart to perform its pumping operation without opening the chest of the patient even though the heart may have stopped for some cause or even though the heart be in fibrillation. The machine provides a reciprocating plunger readily adjusted with respect to the chest of the patient, applying the pressure gently to the chest, and applying the pressure through spring means which is readily regulated so as to provide the pressure desired. Means is also provided for pumping air into the lungs of the patient and this is coordinated with the action of the heart massaging plunger so that air is fed to the lungs at the moment that pressure is released from the rib cage. Means is provided for regulating the volume of such air passing to the lungs of the patient to take account of the age and physical condition of the patient. Means is also provided for stopping the plunger when desired to allow air or oxygen to enter the lungs for a longer time. When the plunger-actuating motor is de-energized, means is provided for always stopping the plunger in raised position. Means is provided to prevent excessive pressure being exerted on the lungs of the patient. An electric shocking device is provided to stop a fibrillating heart and many other refinements are provided to aid the machine in efficiently carrying out its functions.

Figure 1:
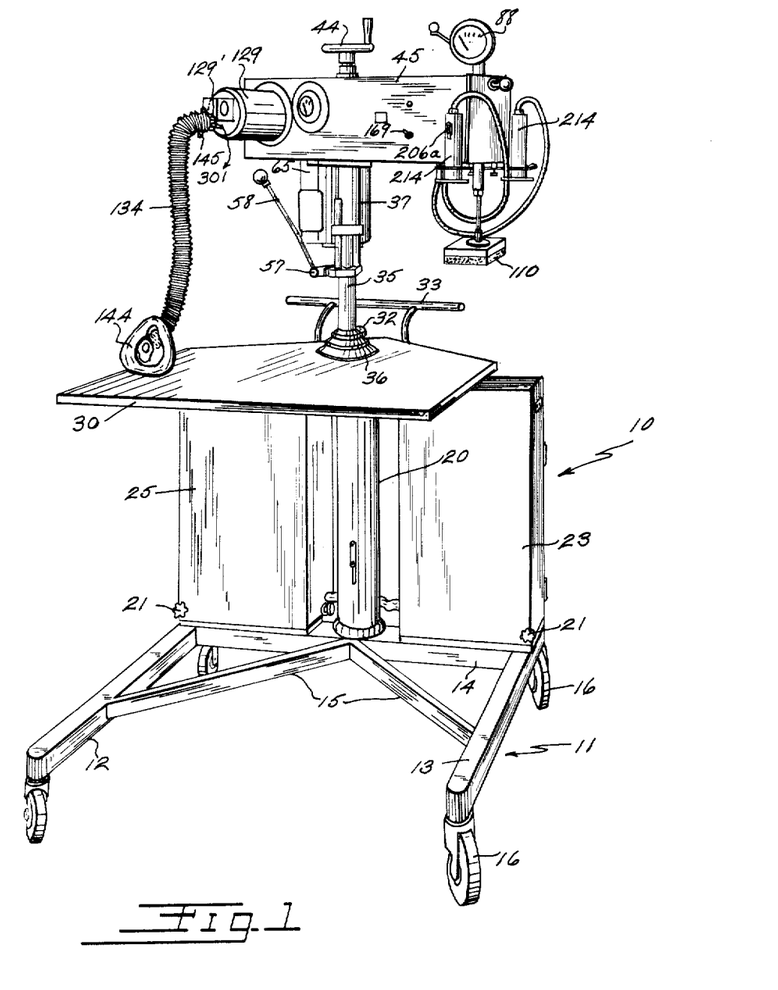
FIG. 1 is a perspective view of a first embodiment of the present invention looking at the device from the right front.

As may be seen in the drawings and more particularly in FIG. 1, the present invention consists of a portable base 10 comprising a horizontally disposed frame 11 having side members 12, 13 and 14, respectively, and being rigidly connected by strengthening struts 15 welded or otherwise suitably affixed thereto and being provided with casters 16 at the corners.

Figure 2:
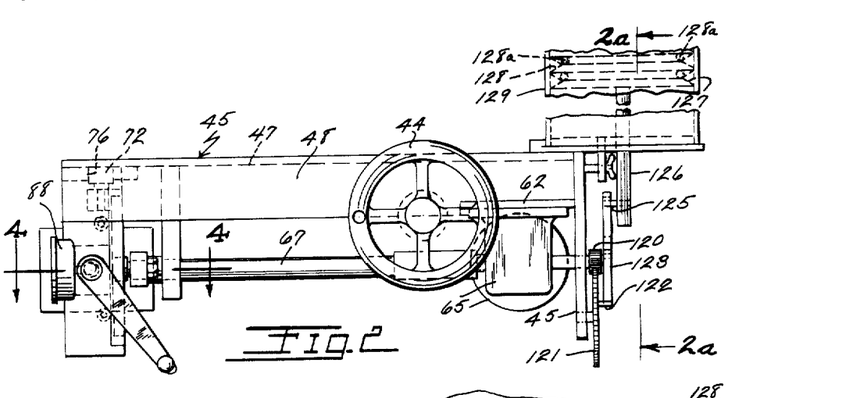
FIG. 2 is a plan view, enlarged, of the mechanical head above the table in FIG. 1, with a portion of the air pump being broken away.
Figures 2A, 3:
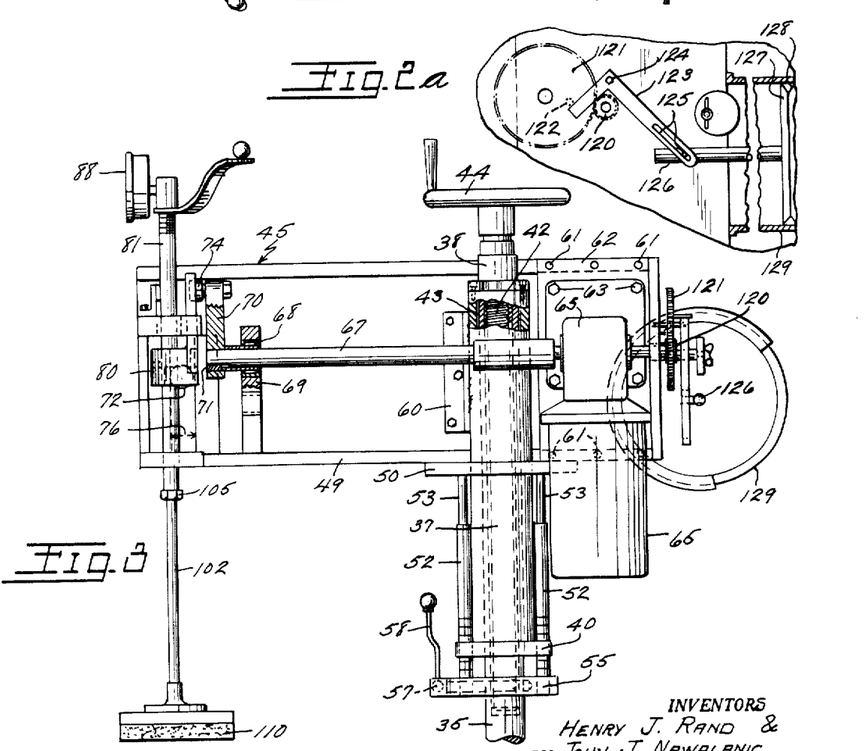
FIG. 2A is a fragmental sectional view taken along the line 2A—2A of FIG. 2.
FIG. 3 is a side elevational view, on the same scale as FIG. 2, of the head of FIGS. 1 and 2, with portions of the swingable crank arm, bearing block, elevating nut and post being broken away in the interest of clarity.

A post 20 is suitably affixed to the frame 11 at a central position on side member 14 and said side member 14 is provided with quickly detachable clamps 21 to facilitate the easy assembly or removal of electrical component housing 23 and 25, respectively, which may be secured to frame 11 upon either side of the post 20. At the top of said post 20 a horizontally disposed clevis (not shown) is provided and is shaped to accept in slidable engagement a table top 30, said table top being provided with a fastening nut 32 having a threaded stem which is disposed in such vertical alignment as to provide a clamp between the clevis and the table 30, thereby holding the table 30 in a horizontally rigid position suitable to support a human body. Table 30 is further provided with a handle 33 to facilitate positioning of the apparatus. Table 30 is also provided with a vertical column 35 by means of a base member 36 which holds the column in said vertical position rigid with the table top. A sleeve 37 embraces column 35 in slidable relation. As best seen in FIGS. 2 and 3, said sleeve 37 is provided with a top cap 38 and a bottom collar 40. Said top cap 38 is made to serve as a bearing for a central shaft 42 threaded with an Acme or other suitable power thread. Said central shaft 42 is disposed in threaded engagement with a stationary nut portion 43 rigid with the top end of said vertical column 35. To the top end of said central shaft 42 a crank wheel 44 is affixed to facilitate rotation of said central shaft 42 thereby raising or lowering the central shaft 42 with respect to the stationary nut 43.

Top cap 38 is positioned to rest in a head 45 which comprises a vertical plate 47 and a top rail 48 and a bottom rail 49 welded or otherwise suitably affixed to plate 47. The bottom rail 49 rigidly holds a bearing plate 50 having an opening through which sleeve 37 may pass in vertical movement. The bottom cap 40 is provided with guide sleeves 52 which are in snug, slidable engagement therewith and said sleeves 52 are snugly and telescopically engaged with spring pressed pins 53. Said pins 53 are urged out of sleeves 52 by springs (not shown) in the bottom of sleeves 52 so that pins 53 always press against the bearing plate 50. Guide sleeves 52 are held in pressed fit engagement in a clamp 55 which snugly and slidably embraces vertical column 35. Said clamp 55 is arcuately interrupted by a radial slot, and a tightening screw 57 is operatively connected with the clamp across the slot so that when screw 57 is tightened by lever 58 it draws clamp 55 into tight engagement with column 35 thereby clamping the head 45 and sleeve 37 rigidly to that fixed column thus preventing any vertical or rotational movement of head 45.

A right angled bracket 60 is welded or otherwise suitably rigidly secured between the sleeve 37 and the head 45, thereby rigidly connecting them together.

The head 45 carries a motor mounting plate 62 fastened by cap screws 61 to rails 48 and 49 respectively. Said mounting plate is drilled and tapped to receive cap screws 63 which fasten gear motor 65 thereto. Motor driven shaft 67 extends from the motor 65 to the other end of the head 45 and is journaled in a bearing 68 and in bearing block assembly 69 which is mounted on head 45.

Figure 4:
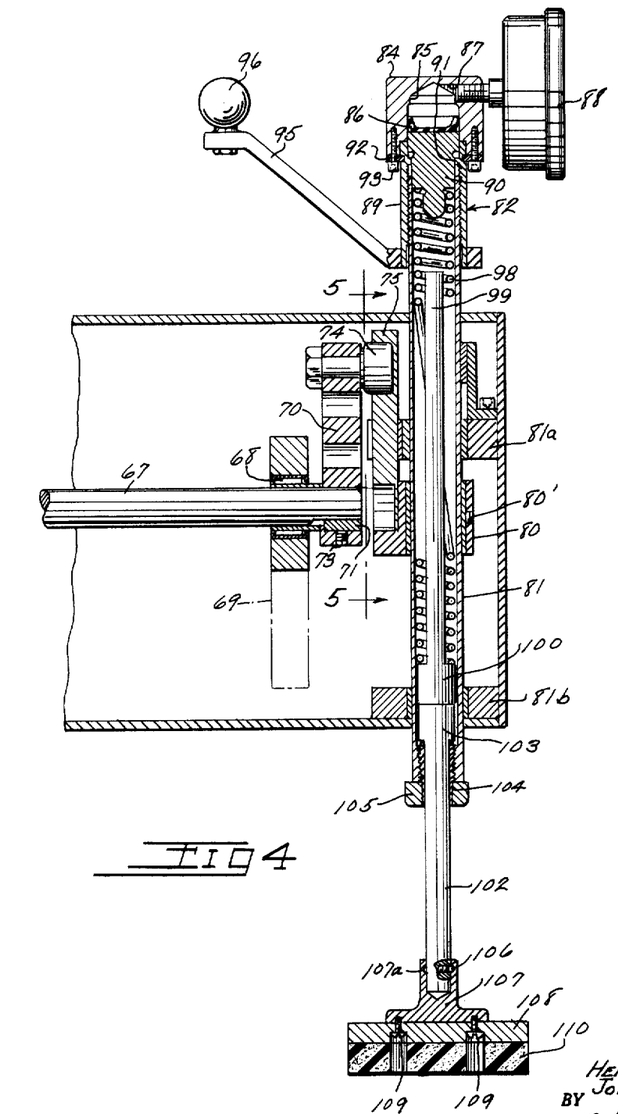
FIG. 4 is a sectional view, enlarged, taken on line 4—4 of FIG. 2 showing the assembly of elements for the massaging plunger and pressure gage.

To provide a reciprocating motion of pressure pad 110 against the chest of a patient, a crank arm 70 is affixed to the extreme end of the drive shaft 67 by means of a key 71 and a lock screw 73 (as best seen in FIG. 4); and a cam follower roller 74 is mounted rotatably upon the free end of the swingable crank arm 70 in running contact with a cam 75. As the roller 74 travels clockwise in the direction of the arrow of FIG. 5, it traverses a generally semi-circular path 78 in the upper portion of the cam 75 during which there is a dwell action of the sleeve 80 and then the roller travels across the horizontal bottom of the cam 75 which causes the cam and the attached sleeve 80 to make a stroke first downwardly and then upwardly (impelled by a spring to be described). Cam 75 is guided by a roller 72 mounted on the cam and traveling in a way fixed to head 45. This structure is such that a controlled stroke cycle is provided giving approximately one-quarter of the cycle for pressure on the chest and three-quarters of a cycle with no pressure. The motor 65, and its gearing, and the proportion of the parts are preferably provided to give about 60 strokes per minute.

A pad of cushioning material 77 (FIG. 5) such as rubber or the like is disposed in the bottom of cam track 78. A block 79 which here is formed integral with the cam 75, but which may be otherwise suitably affixed thereto, is provided with a sleeve 80 which embraces a reciprocatable cylindrical post 81 to which it is adjustably attached by set screw 80'. Supporting blocks 81a and 81b are disposed at each end of the cylindrical post 81 and are welded or otherwise suitably affixed to the head 45. Said supporting blocks 81a and 81b provide bearings for the cylindrical post 81. The upper end of post 81 is threaded to receive a pressure regulating assembly 82. Said pressure regulating assembly comprises a pressure cap 84 having a central bore 85 which retains a diaphragm 86 of rubber or the like. Said central bore 85 is provided with a communicating passage 87 threaded to receive a visual pressure indicator 88. At the open side of cap 84 adjacent the rubber diaphragm 86, a tube 89 is press fitted having a bore diameter matching that of the central bore 85. A piston 90 is held within the central bore 85 by a reduced diameter portion 91 of the tube 89. Said tube 89 is additionally held by a split ring 92 and cap screws 93 at the extreme bottom of pressure cap 84.

Tube 89 is provided with a crank arm 95 and handle 96 to facilitate adjustment of the pressure stroke by relative rotation between 89 and 81 thus positioning the piston 90 relative to a pressure spring 98 housed in post 81. The spring 98 is guided by a plunger shaft 99 and terminates in an enlarged shoulder portion 100 at the lower end of said plunger shaft 99. A second plunger shaft 102 having an enlarged upper head portion 103, matching 100 in diameter (both smoothly slidable inside post 81), is disposed in the bottom of post 81 and has a sliding fit within a bearing sleeve 104 which is retained in post 81 by a bearing retainer 105 threadably connected to the extreme end of post 81. The lower end of shaft 102 is drilled and fitted to receive a spring pressed ball 106 and a chest pad holder 107 is snapped over and retained by the ball 106 fitting in the groove 107a provided in the chest pad holder 107. A back-up plate 108 is mounted by screws 109 to the chest pad holder 107 and a sponge rubber shock dampening pad 110 is bonded to the back-up plate 108 in such a manner as to facilitate a gentle shock absorber effect upon the chest of a patient when pressure is applied. Such pressure is transmitted through spring 98 and registered on indicator 88.

Means is provided for supplying air to the lungs of the patient coordinated with the action of the heart massaging shaft 102 and pad 110. Referring to FIGS. 2, 2A and 3, a pinion 120 is secured to the right-hand end of shaft 67 as seen in FIGS. 2 and 3 and this meshes with a gear 121 which is rotatably mounted in the frame member 45' which is rigid with the head 45. A pin 122 carried by the gear 121 engages against one leg of a bell crank 123 which is oscillatable about a pivot 124 which is secured in a manner not shown to the frame member 45'. The other leg of the bell crank has a pin and slot connection 125 with a piston rod 126 which operates a head 127 which in turn reciprocates a bellows 128 mounted in a cylinder 129 which is rigidly attached to the head 45. The arrangement shown provides a stroke collapsing the bellows 128 on every fourth stroke of the plunger shaft 102 although it will be understood that this may be varied by changing the pinion 120 and the gear 121. The parts are so arranged, as shown diagrammatically in FIG. 5, that the pressure stroke of the bellows 128 occurs when the plunger shaft 102 is in its uppermost position and relieving pressure on the rib cage of the patient. Spring 128a returns head 127 after a pressure stroke.

Figures 7, 8, 9:
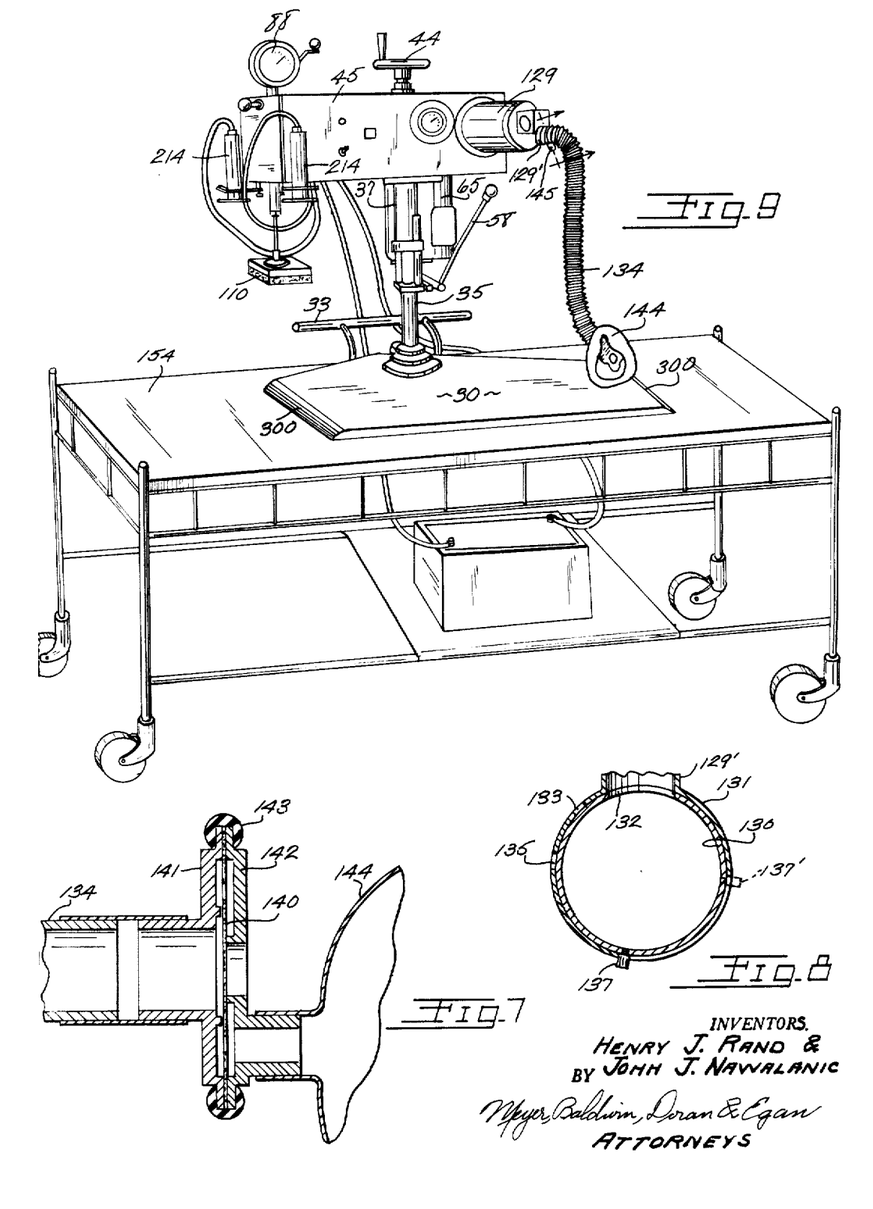
FIG. 7 is an enlarged fragmentary sectional view of a face mask connection used with the invention.
FIG. 8 is a sectional schematic view, enlarged, taken along line 8—8 of FIG. 9 showing the air and/or oxygen metering device carried by the air pump.
FIG. 9 is a perspective view of the device of FIG. 1 modified for use on a table or bed and illustrating a portable feature of this invention.

The air from the bellows 128 passes through an outlet member 129' and then through tube 134 to a face mask 144 adapted to be placed over the face of the patient. An adjustable device is shown in FIG. 8 for permitting part of the air compressed in the bellows 128 to escape to the atmosphere, for instance in the case of a child, so that the full amount of the bellows capacity will not be forced into the lungs incapable of using the same. For this purpose outlet member 129' connects to the bore 130 of a cylindrical member 131. As seen in FIG. 8, bore 130 of member 131 is slotted at 132 to communicate with openings 129', 133 and 135 when lever 137 is advanced through to the dotted position 137'.

As will be seen in FIG. 7, a diaphragm 140 is disposed at the end of tube 134 and between discs 141 and 142, respectively. Said diaphragm 140 is sealed peripherally against pressure by a circular gasket 143 thereby acting to prevent an overloading of oxygen in the patient's lungs when the face mask 144 is in position over the patient's nose and mouth. Diaphragm 140 also permits exhalation of carbon dioxide from the patient's lungs without the carbon dioxide backing up or mingling with the incoming oxygen. Also to guard against overloading the patient's lungs with oxygen, a pressure relief valve 145 is provided communicating with the cylindrical member 131 and, as may be seen in FIG. 10, consists of a cylindrical member 146 having a threaded end 147 to receive a cap 148 which regulates the pressure of a string 139. Spring 139 is biased against cap 148 and piston 149 thereby holding piston 149 in abutting engagement with a shoulder 150 in cylinder 146. Cylinder 146 is provided with a relief vent 151 which permits the escape of air in the event of too much pressure forcing piston 149 outwardly against the normal bias of spring 139.

Connection 301 (FIG. 1) is for the connection of a controlled outlet from an oxygen tank, if desired.

Figures 5, 6, 10:
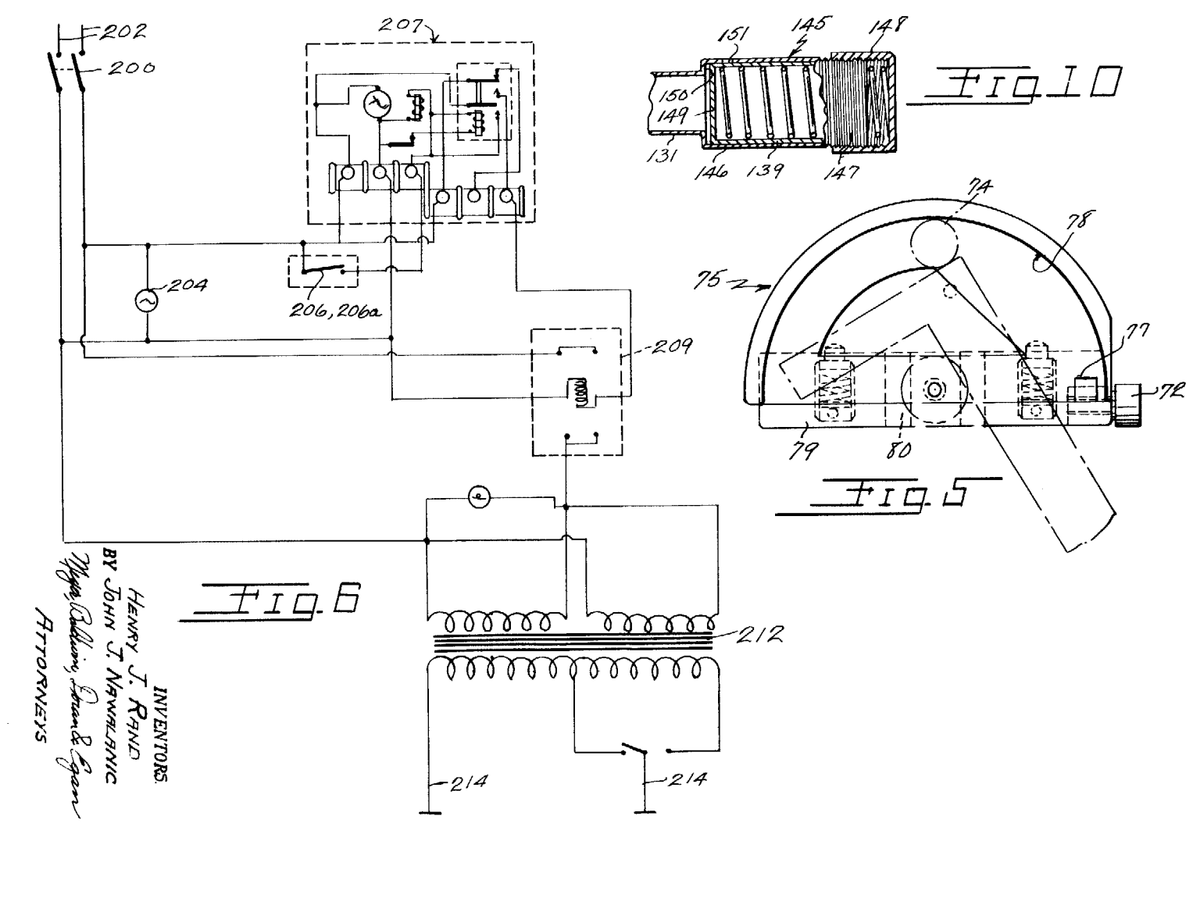
FIG. 5 is a diagrammatic view showing the plunger cam in full lines as viewed from the line 5—5 of FIG. 4 and with the air pump actuator in broken lines in superimposed relation, thereby illustrating an important timing aspect of the present invention.
FIG. 6 is a schematic wiring diagram of the defibrillating electrical unit, parts of which are seen in FIG. 1.
FIG. 10 is a sectional view, enlarged, of the pressure relief valve seen in FIG. 9 near section line 8—8.

Carried in housing 23 and 25 are the electrical connections for the defibrillator unit, FIG. 6, which consists of a circuit breaker 200 connected to a line 202, a pilot lamp 204 connected in parallel therewith, a foot operated switch control 206 or hand switch 206a (FIG. 1) located on the handle part of 214 interposed between one side of the line and a timer 207, from the timer 207 to a relay 209 to one side of a step-up transformer 212 back to the other side of line 202. The other side of transformer 212 energizes electrodes 214, which when energized under control of timer 207 and applied properly to the exterior of the patient's body, provide for the defibrillation of the patient's heart by electric shock treatment.

In operation, a patient in need of resuscitation is placed face-up upon table 30 and the head 45 of the machine is swung into position over the patient. When the pressure pad 110 is positioned over the patient's chest directly above the patient's breast bone vertex, the plungers 99 and 102 are adjusted for the proper amount of chest pressure by turning handle 96 which actuates pressure block 84 as determined by the operator and as is indicated by the visual pressure indicator 88 on pressure block 84. The operator then turns crank wheel 44 which positions the head 45 either up or down and which brings the shock dampening pad 110 into position approximately one-half inch above the patient's chest. Care should be taken at this point to adjust both plunger pressure regulator and plunger position because of the stroke length of the plunger. Between the two the operator should arrive at the most appropriate distance from the patient's chest to safeguard against the possibility of too much plunger stroke cracking or otherwise injuring the ribs of said patient.

Having positioned the plunger and head 45, the face mask 144 is positioned over the patient's nose and mouth and the apparatus is started by throwing switch 169 which energizes motor 65 to drive the shaft 67. The drive gears 120 and 121 through bell crank 123 actuates bellows 62 to pump air or oxygen in the desired amount to the lungs of the patient while simultaneously, but in the proper sequence, the plunger apparatus is massaging the chest cavity of the patient which causes the heart to expand and contract in time with the air or oxygen pumped into the lungs. The plunger pad 110, when actuating the chest cavity, actually artificially pumps or squeezes the heart which may be in a state of fibrillation at this point and by squeezing or pumping the heart, performs the action of massaging the heart from outside the chest cavity, thereby utilizing the pumping action of the heart to carry the oxygenated blood to the brain of the patient which prevents deterioration of the brain tissues from lack of oxygen. Simultaneous to the above action, the attending physician using the electrodes 214 in the defibrillating unit, positions the electrodes upon the patient's body on opposite sides of the heart and then actuates foot switch 206 which energizes the electrodes 214 through the connections heretofore described which induces an electrical shock which may be varied as to voltage and period of application according to the judgment of the operator. Said shock immediately stops the fibrillating heart and the machine then starts the rhythmical beat which is picked up by the heart muscles. The attending physician at this time may vary the amount of air or oxygen to the lungs of the patient by manipulating the lever 137.

FIG. 9 shows the device which has just been described used in connection with a hospital bed 154. Here the table 30 is placed directly upon the bed and carries the column 35 and the head 45 and all of the other parts connected thereto which have heretofore been described. If table or plate 30 is made approximately two inches thick in FIG. 9, and the edges 300 preferably rounded, a patient with his shoulders on plate 30 and the back of his head on bed 154 will automatically have his trachea and air passages open for free entry of air.

Figure 11:
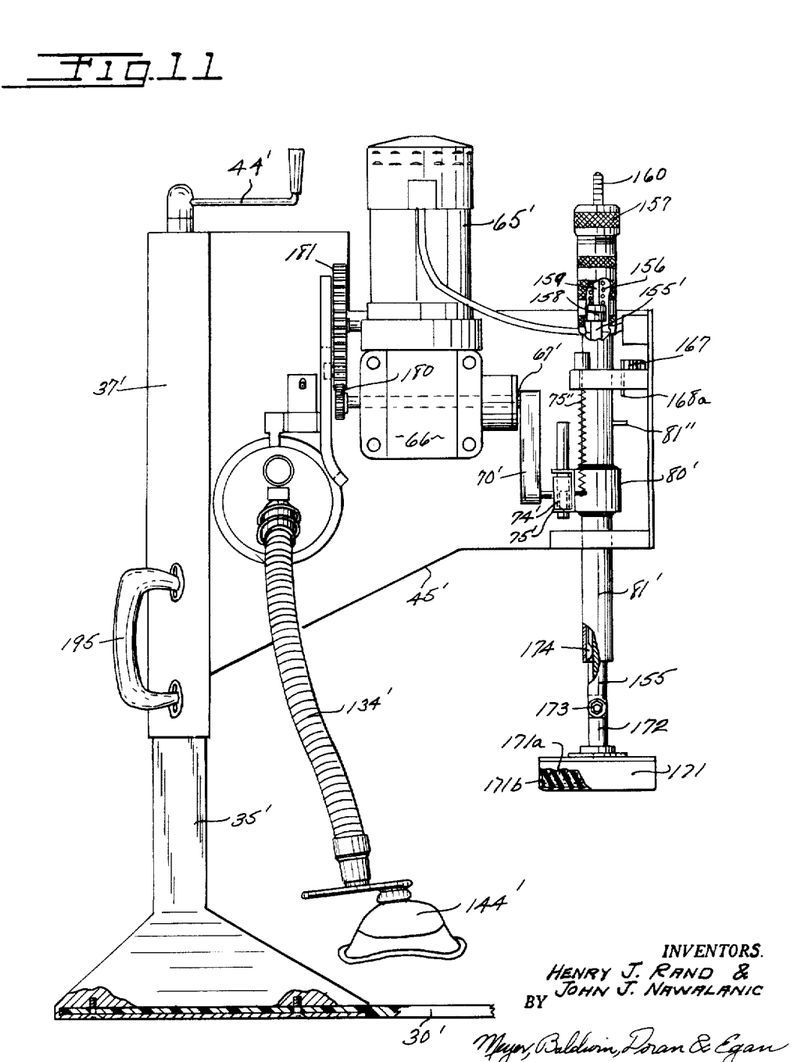
FIG. 11 is a front elevational view of another embodiment of the machine arranged to be readily portable.
Figure 12:
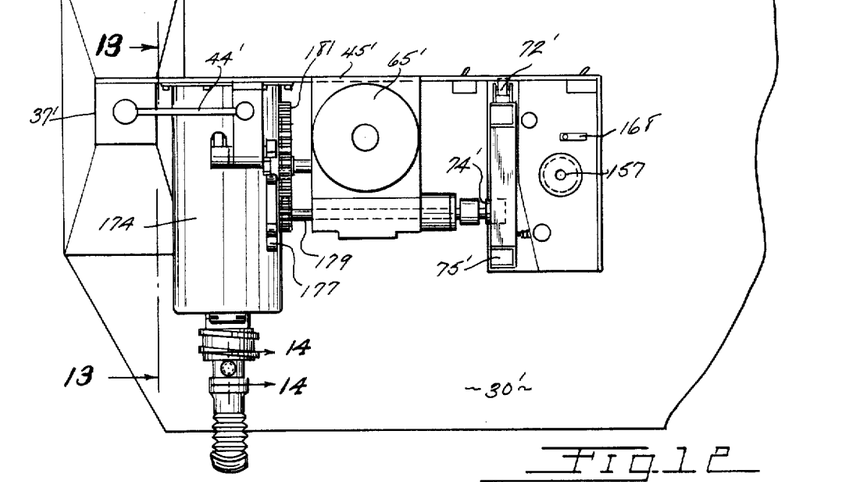
FIG. 12 is a top plan view of the device of FIG. 11.
Figures 13, 14:
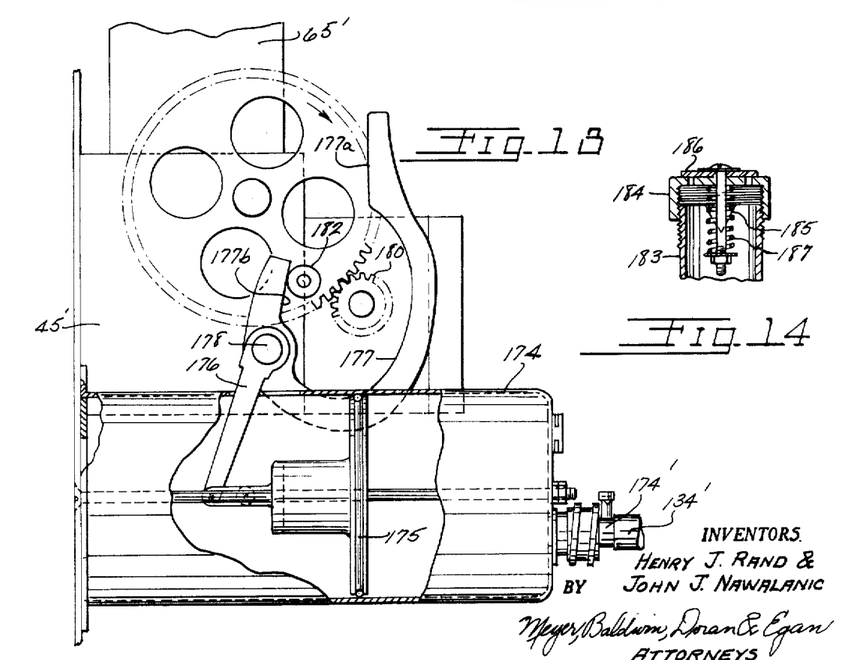
FIG. 13 is a fragmental sectional view, enlarged, taken along the line 13—13 of FIG. 12.
FIG. 14 is a sectional view, enlarged, taken along the line 14—14 of FIG. 12.

In FIGS. 11, 12 and 13, parts having the same function as those just described have been given the same reference characters with a prime suffix. The plate-like table or base 30' has rigidly attached to it the vertical column 35' on which moves the sleeve 37' up and down controlled by the crank arm 44' in the manner previously described. The head 45' is rigidly carried by the sleeve 37' so that the same may be adjusted relative to the table 30' upon which the patient rests. The motor 65' through the reduction gearing 66 drives an output shaft 67' which carries a crank arm 70' on which is mounted the cam follower roller 74'. The cam 75' here consists of a horizontally disposed channel open at both ends which provides the working stroke whereas the idle or dwell portion of the stroke occurs above the channel 75' in the air. The block 80' rigidly connects the cam 75' and the sleeve 81'. The cam 75' is urged upwardly by a spring 75''. The plunger 155 is driven downwardly through a helical compression spring (not shown) captured between the sleeve 81' and the upper end of 155 so that the pressure is delivered through a helical spring as previously described in the first embodiment. Roller 72', carried by 75' rides in a suitable vertical way in head 45' to guide cam 75' during its reciprocation.

The pressure indication is slightly different from that of the first described embodiment. Here the spring 156 is held between the pressure cap 157 and the rod 155' which is an upward extension of the plunger 155. A head 158 abutting 155' carries a rod 159 which extends out the upper end of cap 157 and carries visible indicia 160 so that the pressure graduated rod 159 rises and falls with every cycle of the chest massaging plunger, showing the pressure exerted on the chest of the patient.

As shown in FIGS. 11 and 16, means is provided to stop the plunger rod 155 in its uppermost position whenever motor 65' is stopped. The motor is energized from a source of electric current 161 (FIG. 16) through lines 162 and 163 which are adapted to be connected through switch 164 (manually operated). A supplemental circuit is provided through lines 165 and 166 energizable by contacts 167 when they are engaged. These contacts are controlled through an arm 168 pivoted at 169 on a fixed portion of the frame 45'. A spring 170 normally holds the contacts engaged. An actuator 168a extends downwardly from arm 168 and is engageable by an arm 81'' which is rigid with the sleeve 81' which controls the action of the plunger rod 155. If the operator opens the switch 164 while the plunger is in its down position, the contacts 167 remain closed and the motor 65' remains operating until the upward stroke of the sleeve 81' causes the projection 81'' to engage the actuator 168a which is lifted in an upward direction so as to open the contacts 167 and finally deenergize the motor 65'.

Another improvement of this second embodiment over that first described is shown in FIG. 11 where the pressure pad 171 is carried on a separate plunger extension 172 which has a pivot connection at 173 with the plunger rod 155 so that the pressure pad 171 can adjust itself to the angle of the patient's chest lengthwise of the patient. In other words, the pivot 173 is crosswise of the patient. Key 174 prevents relative rotation between rod 155 and sleeve 81'.

As seen in FIGS. 11, 12 and 13, air is pumped through the hose connection 134' to the face mask 144' from cylinder 174 in which operates a reciprocating piston 175. The cylinder is fixed to the frame 45'. The piston is operated through an arm 176 which is rigidly connected with a double crank arm 177 oscillatable about a fixed pivot 178. Through gear box 66 a shaft 179 drives a pinion 180 which in turn meshes with a gear 181 which is rotatably mounted in a suitable bearing fixed to the frame 45'. The gear 181 carries a cam follower roller 182 which first engages the cam surface 177a as gear 181 rotates in the direction of the arrow of FIG. 13 to cause a stroke of piston 175 toward the left as viewed there. Then, later the follower 182 engages cam surface 177b to cause a pressure stroke of piston 175 thus delivering air out of the cylinder 174 to the hose 134'. Here again, as in the first described embodiment, the parts are so arranged that the pressure stroke of piston 175 occurs at the time the plunger rod 155 is in its raised position. Obviously, the ratio of pressure strokes of air with relation to pressure strokes of plunger rod 155 may be varied by changing the gears 180 and 181, or by adding more followers 182.

The device shown in FIG. 14 is a combined pressure safety valve and a control of the amount of air going to the patient's lungs. The housing 183 communicates with the nipple 174' through which the air passes from cylinder 174 to hose 134'. A threaded cap 184 controls the amount of opening of a V-shape notch 185 in the member 183 and the more of this notch which is exposed, the more air will escape to the atmosphere instead of going to the patient's lungs. The device 186 is a pressure relief valve controlled by spring 187 so as to limit the amount of pressure exerted by the air in the patient's lungs.

Figures 15, 15A:
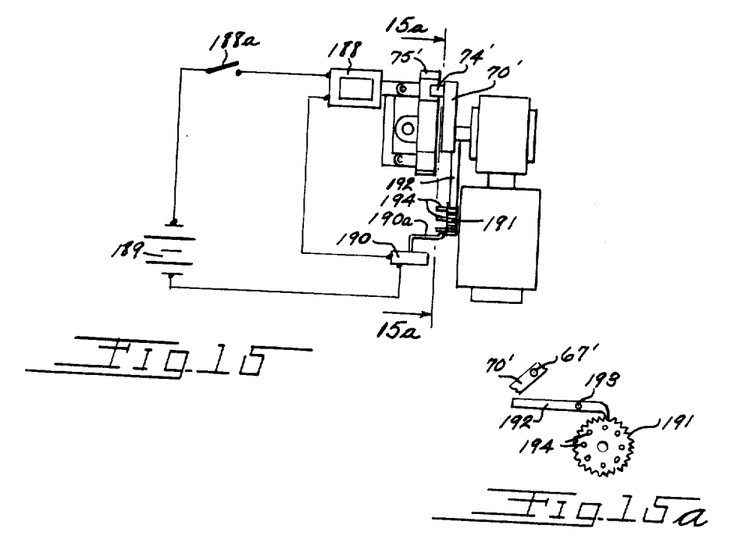

The device shown in FIG. 15 may be applied to either of the embodiments thus far described so as to stop the action of plunger rod 102 or 155 when desired to relieve chest pressure so as to allow more air or oxygen to enter the lungs for a longer period of time. This gives more time also for the heart to fill and expand. Here the cam track 75 or 75' is mounted on movable ways carried by the frame 45 or 45' and an electrically operated solenoid 188 is provided so that when the same is energized it pulls the cam track 75' in the direction of the arrow of FIG. 15 away from the cam follower 74' thus allowing the crank arm 70' to rotate idly. The solenoid is energized from a suitable source of power 189 controlled by a microswitch 190. A ratchet wheel 191 is suitably mounted for rotation with respect to the frame member 45'. A ratchet control arm 192 is pivotally mounted at 193 on the machine frame in a manner not shown. As the arm 70' rotates it engages the ratchet control arm 192 moving the same one notch at a time and causing suitably positioned pins 194 carried by the ratchet wheel to regularly engage the actuator 190a so as to open the switch 190. In the operation of this device, the roller crank arm 70' trips the ratchet cam, the switch 190 is energized by means of one of the pins 194 which energizes the solenoid 188, which in turn moves the cam track 75a toward the left as viewed in FIG. 15 allowing the roller 74' to pass idly through the air thus eliminating a pressure stroke of the plunger rod 155 and pressure pad 171. Manual switch 188a puts this device in use only at the choice of the operator.

The pressure pad 110 or 171 preferably has a bottom structure presented against the patient having a resiliency approximately equal to the detail structure shown in FIG. 11, where 171a is sponge rubber approximately 1¼ inches thick having an American Society for Testing Material number R11, and 171b is a covering of sheet rubber about ⅟₁₆ to ³⁄₃₂ inch thick and about the durometer of a pneumatic tire inner tube. The sponge rubber of pad 110 is preferably a little stiffer than A.S.T.M. No. R11. In any case, preferably pad 110 or 171 is about four inches wide and five inches long with the longer dimension lengthwise of the patient's body. In FIG. 11 this means the four inch dimension is parallel to pivot 173.

Other than as described, the device shown in FIGS. 11, 12 and 13 operates like the first described form to massage the heart, when the motor is energized, with regular strokes and to force air into the lungs of the patient in timed relation thereto under the controls described. The device of FIGS. 11, 12 and 13 weighs about sixty pounds and a man can carry the same easily by grasping the handle 195.

While an electric motor has been described for providing power, this invention might use in place thereof an internal combustion engine, air- or gas-powered motors, and the like.

This invention is also useful with victims of drowning, asphyxiation, choking, etc.

What is claimed is:

1. Apparatus for artificially effecting perfusion in a heart which has ceased beating, comprising a pressure applicator, means for supporting said applicator in a position exteriorly of the body of a patient and substantially directly over the breastbone of the patient, and power means rhythmically moving said pressure applicator alternately downwardly and upwardly at a rate approximately equal to the normal rate of heart beat and with a stroke of sufficient amplitude to alternately depress and release the breastbone and thereby cause an artificial pumping action of the heart, there being means to adjust the force applied by said applicator in a smoothly graduated uninterrupted manner during operation of said power means to a value not injurious to the body of the patient, and to indicate said applied force to an attendant.

2. Apparatus as defined in claim 1 including a pressure applying spring connection operatively associated between said power means and said pressure applicator, said means to adjust the force applied by said applicator comprising means for varying the tension in said spring connection, and said means to indicate said applied force comprising a visual indicator of pressure applied through said tensioned spring.

3. Apparatus as defined in claim 1 including means between said power means and said applicator holding the latter in breastbone depressing position for approximately one-fourth of each rhythmic movement and in release position for three-fourths of each rhythmic movement.

4. Apparatus as defined in claim 1 including means for interrupting said rhythmic movement for at least one downward and upward cycle.

5. Apparatus as defined in claim 1 wherein said power means includes an electric motor operatively connected with said applicator, a switch having "on" and "off" positions for controlling flow of electricity to said motor, and means for causing said motor to stop with said applicator in raised position after said switch is turned from "on" to "off" position.

6. Apparatus as defined in claim 1 including means for forcing air into the lungs of a patient in timed relation to the movement of said pressure applicator.

7. Apparatus as defined in claim 6, including means for varying said timed relation.

8. Apparatus as defined in claim 6, including means for varying the output of said air-forcing means to the lungs of a patient.

9. Apparatus as defined in claim 1 wherein said means for moving said applicator upwardly and downwardly comprises a generally vertical reciprocatable plunger on the lower end of which said applicator is pivotally connected in the form of a rectangular pad, said pivoted connection extending crosswise of the patient's body, and said pad being rectangular having its shorter dimension generally parallel to said pivoted connection.

10. Apparatus as defined in claim 9 wherein said pad has a bottom structure presented against the patient and having a resiliency approximately equal to a pad of sponge rubber having A.S.T.M. number R11.

11. Apparatus for artificially effecting perfusion in a heart which has ceased beating, comprising a pressure applicator, means for supporting said applicator in a position exteriorly of the body of a patient and substantially directly over the breastbone of a patient, and power means rhythmically moving said pressure applicator alternately downwardly and upwardly at a rate approximately equal to the normal rate of heart beat and with a stroke of sufficient amplitude to alternately depress and release the breastbone and thereby cause an artificial pumping action of the heart, there being means to adjust the force applied by said applicator in a smoothly graduated manner during operation of said power means to a value not injurious to the body of the patient and to indicate said applied force to an attendant, said means for supporting said applicator comprising a vertical tubular post carried by said supporting means, a plunger within said post and carrying said pressure applicator at its lower end, a pressure cap having a threaded connection with the upper end of said post and having a piston chamber opening downwardly, a piston block reciprocatable in said chamber and having its lower end spaced from said plunger, a helical compression spring in said post and engaged between said plunger and the lower end of said piston block, said pressure cap chamber being closed save for an outlet communicating with said means to indicate said applied force, said power means having a connection with said post for reciprocating the same axially, and said means to adjust the force applied by said applicator including means for varying the threaded connection between said cap and said post while said power means is operating.

References Cited by the Examiner

UNITED STATES PATENTS

| | | | |
|---|---|---|---|
| 768,523 | 8/1904 | Dittmar | 128—54 |
| 1,918,546 | 7/1933 | Johnson | 128—28 |
| 2,062,300 | 12/1936 | Erickson | 128—55 X |
| 2,484,306 | 10/1949 | McClain et al. | 128—28 |

FOREIGN PATENTS

| | | |
|---|---|---|
| 238,278 | 9/1911 | Germany. |
| 588,091 | 11/1933 | Germany. |
| 673,551 | 3/1939 | Germany. |

OTHER REFERENCES

Boehm, R.: V. Arbeiten aus dem Pharmakologischen Institute der Universitat Dorpat; 13 Uber Weiderbelebund nach Vergiftungen and Asphyxie, Arch. exper. Path. u. Pharmakol 8: 1878.

Kouwenhoven, W. B, Jude, Jr. Knickerbocker G. G.: Closed Chest Cardiac Massage, J.A.M.A. 173; 1064–1067, July 9, 1960.

"Ventricular Fibrillation," by Beck et al., from JAMA, Dec. 13, 1947.

RICHARD A. GAUDET, *Primary Examiner.*

R. J. HOFFMANN, *Examiner.*

L. W. TRAPP, *Assistant Examiner.*